8416X
G. CHRISTIAN.
LEVER SHEARS.
Patented Sept. 20, 1834.
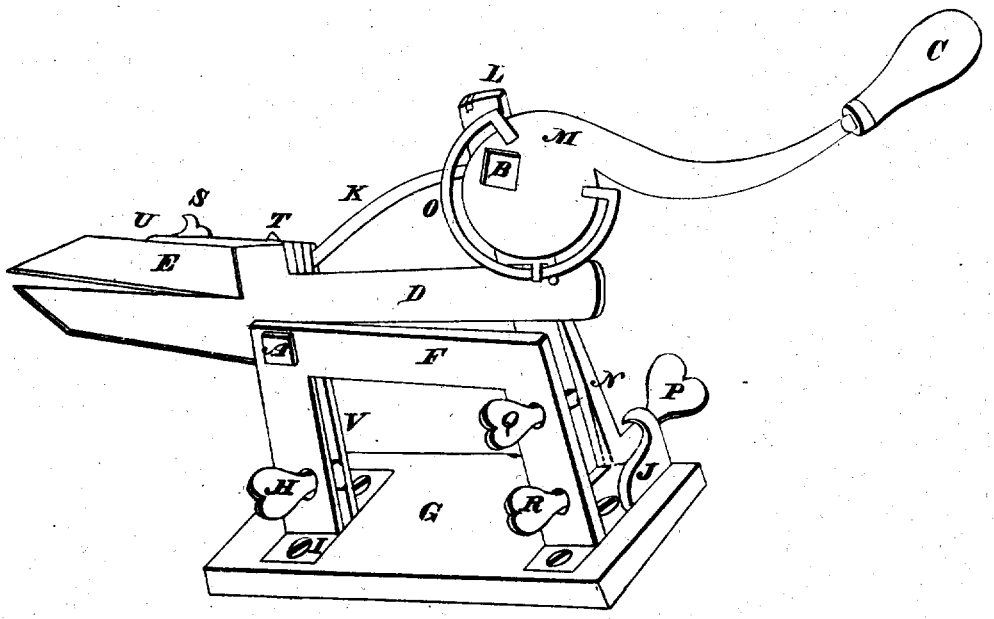

Sept. 20. 1834 8416X 459

George Christian of Mentz Cayuga Co. New York

Letters Patent.

The Schedule referred to in these Letters Patent and making part of the same containing a description in the words of the said George Christian himself of his improvement in the application of the power of the lever to Shears for cutting iron, steel, copper, Brass, tin, &c. &c. and also a new and useful improvement in shears for the above named purposes.

To all to whom these presents shall come. Be it known that I George Christian of Mentz in the County of Cayuga and State of New York have invented a new and useful improvement in the application of the power of the lever to Shears for cutting iron Steel Copper, Brass, Tin, &c. &c. and also a new and useful improvement in shears for the above named purposes. and that the following is a full and exact description of the construction and operation of said machine, as invented or improved by by me, and in giving the description thereof reference will be had to the above drawing. Letter G represents the Bench or Platform which supports the machine. Letters I & J. two horizontal plates lying cross-wise and fastened to bench or platform G. which plates support the superstructure of the machine. F.F.F. represents one piece of the machine. the two side parts thereof represent two perpendicular posts. the right hand post passes through plate J at right angles. thence through Bench G. and fastened by a screw at the bottom. The left hand post passes at right angles through ~~the~~ plate I. thence through Bench G and fastened by a screw at the Bottom. The upper part of F.F.F. represents the lower blade of the left hand shears. which blade passes from left hand post of F F F to the right hand post of the same at right angles with both posts at the distance of the thickness of plate D.D. and back of left hand post F. [illegible] is Post V. which passes down through Plate I. thence through bench G. thence up parallel with post F. last mentioned which post V. passes sufficiently higher than post F. last mentioned to make room for the upper part of left hand Shears. From the upper part of Post V and to the left protrudes plate E. which is the upper blade of the left hand Shears. Letters D.D. represent a plate which is the upper blade of right hand Shears and the lower blade of left hand Shears. The fulcrum of both Shears being in A. which is extended back and

8416X through plate V and there fastened by a thumb screw. from or near plate J. and
back of the right hand Post E at the distance of thickness of the Plate D.D. and
parallel with post F last mentioned extends post I. upwards above post F.
last mentioned sufficiently high to attach the fulcrum of the lever M.C. and
to give play to the upper blade of left hand shears. and to give play also to the cir-
cular end of Lever M.C which lever passes from the circular end of the same
something in the manner of tangent. The handle of the said lever is at C. The
fulcrum of the lever last aforesaid is represented by B which is extended through
post I. and brace N & K and firmly supported by a thumb screw on the back
side. The end of the lever M.C. at M is a flat plate of the thickness the plate
D.D. made in a true circle or so much thereof as passes along the inclined —
plane of the upper part of the left hand shears. The fulcrum B is placed in the lower
extremity of the circular end of the lever M.C. when the end C of the lever is raised
perpendicular upon the fulcrum. The hoop or stirrup O is nearly an half circle
fastened by rivets or screws at each end in the circular plate of the lever. One end
thereof fastened near the edge of the circle of the lever and in front and a little
above the fulcrum B. as the lever hangs upon the fulcrum. The other end fastened
a little above the greatest distance of the circle from the fulcrum; and near the edge
of the circle and in the front of the same as the lever hangs upon the fulcrum.
Said hoop or stirrup is so constructed as to stand out from the circular end of
the lever M.C sufficiently far that the same will pass down the side of the plate
D.D and in front of the same and pass under & through Hook or eye marked
2. which hook or eye is fastened at one end in plate D.D. and so constructed
as to pass over hoop or stirrup O by the operations of hoop or stirrup O with
hook or eye 2. in raising the end of the lever M C will open both right &
left hand Shears and by forcing down the lever again will close both shears. the
circle end of the lever acting upon the inclined plane of the upper blade of right
hand shears N represents a brace fastened to plate I. by a thumb screw at exten-
ded end of fulcrum B. thence to extended part of plate J into a groove therein
where the brace N. is made to turn and meet the thumb screw P in said groove
from turned up extremity of plate J. In addition to the use of brace N as a
brace, it is used with thumb screw P to tighten and regulate the right hand shears
K represents a brace fastened at the thumb screw on the extended part of fulcrum
B

8416 X thence to the screw T. thence along the back side plate E to U. S represents a thumb screw through extended brace K. against plate E which regulates left hand shears H represents a thumb screw which supports left hand post F and post V. between both last named posts and around said last mentioned screw is a stay of the thickness of plate D.D. — R & Q represent thumb screws which pass thro left hand post F and post I. which supports the two last mentioned posts. The whole machine is constructed of iron and steel except bench or platform G and the handle of the lever M. C. I claim that the shears are constructed so that two pairs of shears are contained in one machine. being a new improvement, and the principles of the lever M. C. is applied to the shears which is a new invention. as well as the ways of regulating the shears which is also a new improvement Witnesses
Denison Robinson
David Vermilya George Christian Drawing